INVENTORS
RICHARD H. FULLER
DUDLEY A. BUCK
BY Kenway, Jenney, Witter & Hildreth
ATTORNEYS INVENTORS
RICHARD H. FULLER
DUDLEY A. BUCK
BY Kenway, Jenney, Witter & Hildreth
ATTORNEYS INVENTORS
RICHARD H. FULLER
DUDLEY A. BUCK
BY Kenway, Jenney, Witter & Hildreth
ATTORNEYS 2,987,707

MAGNETIC DATA CONVERSION APPARATUS

Richard H. Fuller, Cambridge, and Dudley A. Buck, North Wilmington, Mass., assignors, by mesne assignments, to Giddings & Lewis Machine Tool Company, Fond du Lac, Wis., a corporation of Wisconsin Filed Apr. 19, 1955, Ser. No. 502,324
14 Claims. (Cl. 340—174)

The present invention relates in general to binary information processing apparatus. More particularly, the invention pertains to the conversion of numerical information in binary or coded binary form into time spaced signals absolutely equal or proportional in number to the value of the number originally represented in binary form. Examples of useful applications of the conversion of digital, numerical information from binary or coded binary form into absolute form may be found in the copending applications of McDonough et al., Serial No. 517,566, filed June 23, 1955 and now abandoned, and Serial No. 589,491, filed June 5, 1956.

It is the general aim of the invention to provide in such conversion apparatus a simplified and reliable storage means for information in binary form, and which permits repeated interrogation or "reading" of the stored information without destroying such information or requiring that it be moved, i.e., "rewritten," from one place to another.

An important object of the invention is to bring about a magnetic shifting register for receiving information in binary form, and which itself serves as a storage register permitting repeated interrogation of the information that has been shifted in, the transfer connections which produce the shifting action acting also to facilitate read-out in response to interrogation.

A related object is to do away with a separate storage register in conversion apparatus of the type described, and to provide a magnetic shifting register which serves also as a storage means, and yet which requires only two magnetic elements per binary digit or "bit."

An understanding of this invention will be aided by reference to the accompanying drawings in which FIG. 1 is a block diagram of a magnetic register, a device for feeding information into the register, and means for interrogating or sensing the register to produce a number of pulses on an output line proportional to the vale of the number held in the register.

The illustrated apparatus utilizes a two-core per digit magnetic shift register which acts both as a storage medium for the digital information received from any source such as a punched tape, and as a gating device to control the passage of pulses to an output line. The absolute number of pulses in a given period on the output line is equal or proportional to the value of numerical information appearing in binary form on the tape and shifted into the register. By way of example as shown in the above-mentioned applications this output pulse train may then be translated into an analogue variation such as a phase shift between two wave forms.

The register is first set in accordance with the stored binary digital information. A single output or sensing-winding is connected, preferably through an isolating rectifier, with each permanent-storage core in the register; however, each core in the register is sensed or interrogated separately by potential output pulses. The state of the core determines whether or not a corresponding pulse appears on the output line in response to such interrogating pulse.

The interrogating pulses are produced by a pulse generator preferably in the form of a continuous train of equally spaced pulses. These pulses are passed through a dividing chain of cascaded flip-flops. Each successive flip-flop alternately sends one pulse to open a magnetic gate preparatory to interrogating a core in the register, and sends the next pulse on to the succeeding flip-flop. The effect of the divided chain is to utilize each pulse in the train from the generator to interrogate one core in the register, the number of interrogating pulses sent to each core being proportioned to the value assigned to the digit place for that core.

The interrogate pulses are actually produced by the above-mentioned magnetic gates, there being one for each core in the register. These gates are set or "opened" by pulses from the respective flip-flops of the dividing chain and tripped by the same pulse, delayed and amplified, sent over a separate driving line. The interrogate pulses produced in this way by the gate are sufficiently great in amplitude to produce a quadrature field around the core which is capable of "reading" its contents without destroying its magnetic state.

Figure 1:
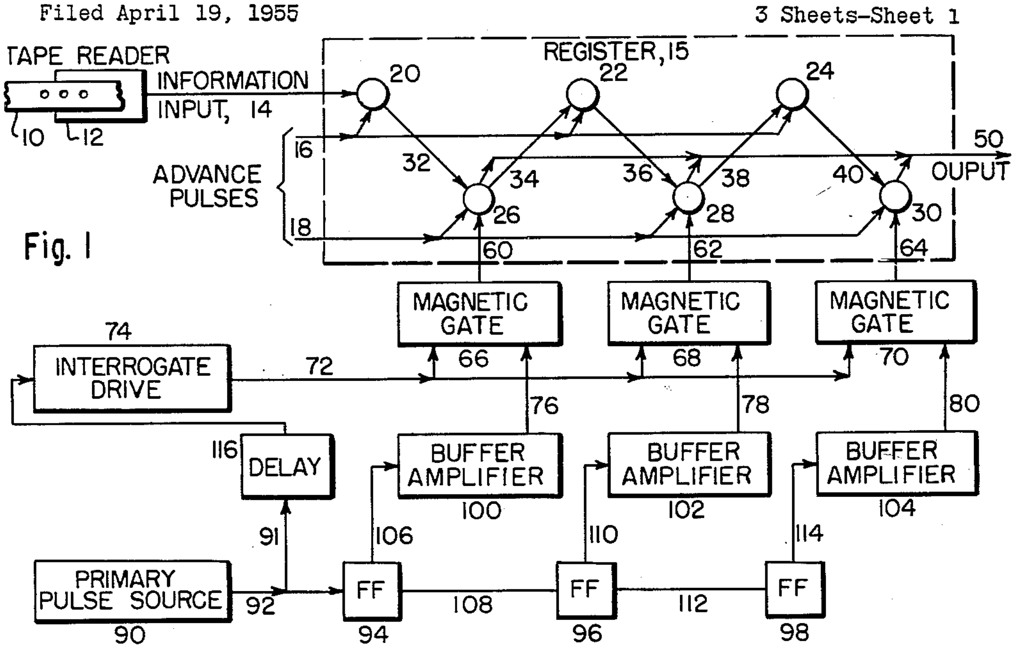
Figure 6:
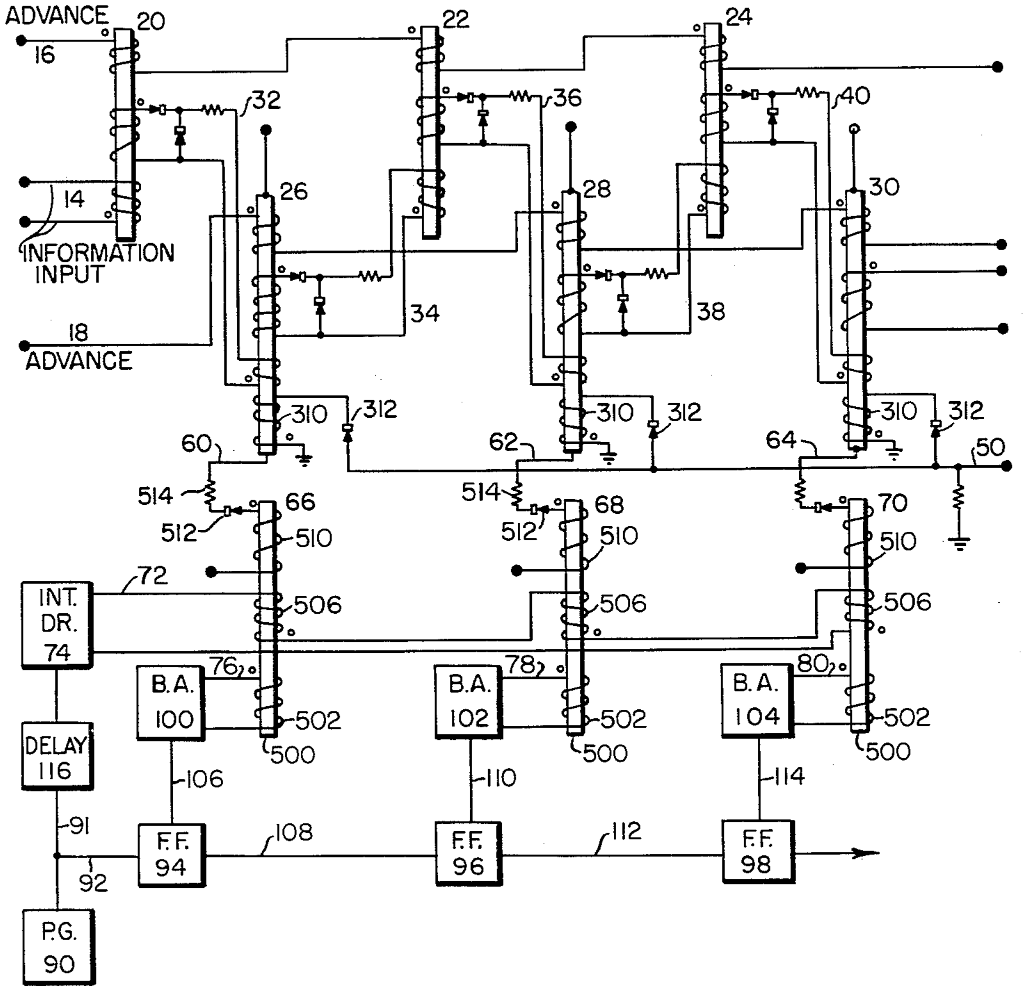
FIG. 6 is a schematic diagram of the system of FIG. 1 showing the windings on each magnetic element.

The overall system is illustrated in block diagram form by FIG. 1 and the windings are shown in greater detail in FIG. 6. The binary digital information may in the first instance be stored in permanent form as a row of holes and spaces along a punched tape 10, which is read by a conventional tape reader 12. The reader output in the form of pulses (or the absence of pulses) capable of magnetizing a magnetic storage element is fed from the tape reader over line 14 to the magnetic shift storage register 15.

The register 15, as shown, is composed of two groups of cores. The first group of transfer cores 20, 22 and 24 provide temporary storage for the binary digital information as it is being stepped into the register in a manner which will be later described. The three additional cores 26, 28 and 30 constitute permanent information storage media, and it is these three latter cores that are interrogated to determine the register status. Each of the cores in this second group is connected to one of the cores in the first group by a read-in winding and to a second core in the first group by a read-out winding. Thus core 26, the first core in the group, is connected to core 20 by a read-in winding 32 which will transfer information from core 20 to core 26. This latter core is connected to core 22 in the first group by a read-out winding 34, which will read information from core 26 to core 22. Similarly, windings 36 and 40 will read information from the first group of cores to the second, and winding 38 will read information from core 28 back to core 24 in the first group.

The exact form of these connections, which makes it possible to read information in one direction only, will be described in greater detail by reference to FIG. 2. It will be understood that the illustrated register 15 is adapted to receive three-digit binary numbers, e.g. "101" which is equivalent to the decimal number "5," but that by adding cores the number of digits accommodated may be increased to the extent desired. In the present example, the cores 26, 28 and 30 represent digits assigned the values of 4, 2 and 1, respectively, in well known binary form. If cores 28 and 30 are in the "1" state, the register holds the decimal value of three, and if cores 26, 28 and 30 are all in the "1" state, the register holds the decimal value of seven.

All of the cores in the first group are also associated with an advance winding 16 which passes around each core in series. Similarly the cores 26, 28 and 30 in the second group are associated with an advance winding 18. For purposes of "reading out" of the register, each of the cores 26, 28 and 30 has an output winding 310 connected through isolating rectifiers 312 (FIG. 6) to an output line 50, as will be described in detail by reference to FIG. 3.

Sensing or interrogation pulses are applied to the second group of cores in the register over leads 60, 62 and 64 leading respectively from the magnetic gates 66, 68 and 70. The construction of these gates will be better understood by reference to FIGS. 5 and 6, to be described later.

Each gate produces interrogation pulses which are applied to one of the storage cores in the register over the above-mentioned leads 60, 62 and 64. These interrogation pulses are produced by the magnetic gate in response to energization over the driver lead 72 which connects with each magnetic gate in series and is energized by the interrogate driver 74. The driver 74 sends out one large delayed pulse for every pulse produced by the pulse source. Each of the magnetic gates must be set or "opened" by a pulse over the input leads 76, 78 and 80 before it will respond to an interrogation pulse from the interrogate driver over lead 72.

Both the setting pulses and the driving pulses are derived from a primary pulse source 90 which produces a continuous stream of potential command pulses over lead 91 through a brief delay element 116 to the driver amplifier 74 and over the output channel 92 to the flip-flops 94, 96 and 98. The flip-flops 94, 96, and 98 are associated with the storage cores 26, 28 and 30, respectively, and the first flip-flop 94 corresponding to the highest order digit place core (core 28 is assigned the value of four) is connected to receive the pulses from the source 90. The flip-flops in turn set the magnetic gates through the relatively low level buffer amplifiers 100, 102 and 104.

The operation of a chain of cascaded flip-flops driven from a pulse generator is well known in the art and will be outlined here only in broad terms for completeness. For each pulse from source 90 over line 92, flip-flop 94 will change state once. The two outputs of the flip-flop will be square waves the frequency of which will be half that of the pulse input rate. For the purposes of this invention, each output is differentiated to form pulses and then pulses of a single polarity only are chosen. As is the case in any bistable circuit, outputs may be taken from either tube, and in case of the flip-flop 94 one output goes to buffer amplifier 100 over lead 106 and the other output goes to the next flip-flop 96 over lead 108. The pulses on these two lines are synchronous and 180° out of phase and each is at a rate one-half that of the pulse input rate to flip-flop 94. Similarly, flip-flop 96 produces out of phase synchronous pulses on leads 110, 112 and at a frequency one-half of that for the pulses supplied on the input line 108, or one-quarter the frequency of the pulses appearing on the line 92. The flip-flop 98 produces output pulses on the line 114 at a frequency one-half that of its input pulses on line 112, or one-eighth the frequency of the pulses appearing on the line 92. It will be seen that as the flip-flop chain receives pulses from the source 90, the non-carry output pulses appearing on the lines 106, 110 and 114 will all be spaced or non-coincident in time. The numbers of pulses provided on the lines 106, 110 and 114 from the flip-flops 94, 96 and 98 are weighted in proportion relative to the total number of pulses from the source 90 according to the value assigned to the digit place for the corresponding storage core 26, 28 or 30. For example, for each eight pulses from the source 90, four pulses will appear on the line 106, two pulses will appear on line 110, and one pulse will appear on line 114.

The interrogate driver 74 is also driven from the primary pulse source 90 over lead 91. However, this driving amplifier 74 amplifies the pulses from the pulse source after they have been delayed a short period by the delay element 116. The construction of the magnetic gate 66 is such that the gate is set in a condition ready to interrogate the register by a pulse over line 76. It is immediately thereafter tripped and reset by a delayed pulse amplified by the interrogate driver 74 which is fed to the gates over lead 72. It is this delayed pulse which produces the interrogating output pulse on lead 60, 62 and 64.

In summary, if eight pulses are introduced on input line 92, four pulses will be fed to magnetic gate 66 over line 76, two pulses asynchronously spaced between those on line 76 will appear on line 78 to set magnetic gate 68, and one pulse will appear on line 80 to set magnetic gate 70. In each instance after these gates have been set the same initiating pulse from the source 90 delayed and amplified, is transmitted over lead 72 to trip the gate and produce a pulse which will interrogate the magnetic register, and the number of pulses from (in the example) zero to seven, appearing on the output line 50 will be a function of the magnetized state of cores 26, 28 and 30, i.e., the value of the binary number stored in the register. The state of these cores is in turn originally set from the magnetic tape 10 through the action of the tape reader 12.

Figure 2:
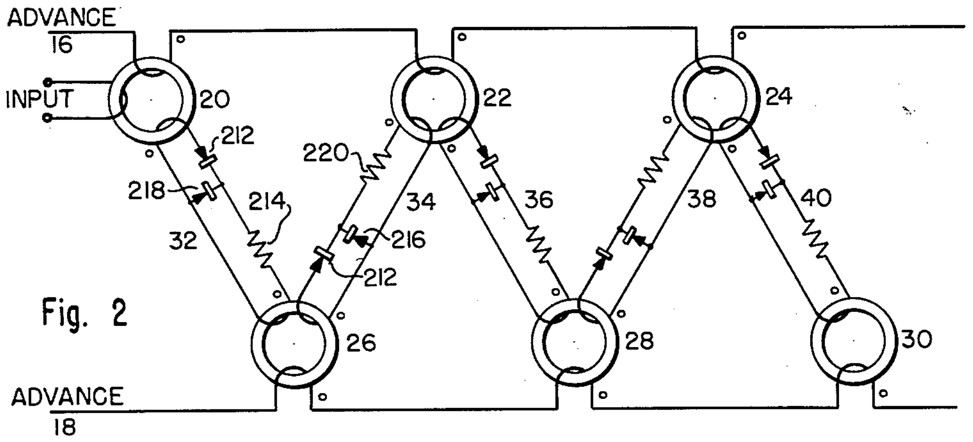
FIG. 2 is a detail schematic of the two core per bit magnetic shift register (sensing or output windings omitted).

The construction of the magnetic shift register is more completely illustrated in FIG. 2 where the interconnections between the two banks of cores are shown in detail in schematic form. The output windings 310 have been omitted from FIG. 2 for purposes of simplicity. The transfer loop or winding 32 which transfers information from core 20 to core 26 carries a rectifying element 210 across the winding and the rectifying element 212 and the resistor 214 in series with the winding. The result is that it is possible for a current to flow in a clockwise direction around this loop 32 connecting core 20 to core 26. However, a change of flux in core 20 which would tend to set up a counterclockwise current will result in this current being blocked by the rectifier 212. In addition, a change of flux in core 26 which would tend to set up a similar clockwise current in winding 32 will find that this current is shunted through a rectifier 210 so that it will not read back and tend to influence the state of core 20. The construction of transfer winding 34 connecting core 26 and core 22 is the same as the construction of winding 32. Thus, the rectifier 216 is connected in shunt across the winding and the rectifier 218 and the resistor 220 are in series with the winding.

The construction and operation of two core per bit magnetic shift registers is known in the art and will therefore be described here in summary form, for purposes of completeness only. It will be realized by those familiar with this art of magnetic registers for handling digital information that the material of the cores is of the type which has a substantially rectangular hysteresis loop characteristic. In the handling of digital information, it is necessary to adopt the convention whereby magnetization of the toroidal elements of the register in one direction constitutes the storage of a digital 1 and in the other direction constitutes an 0. Assuming for the moment that an input pulse of a given polarity over line 14 sets core 20 with a digital 1, and that no other information has been read into the register, the operation is as follows:

An advance pulse is applied (from a suitable source not shown) to the advance winding 16 thereby changing the state of the core 20 from the storage of a 1 to its opposite condition, namely, the storage of an 0. This reversal of magnetization will be assumed to produce an output pulse of current in winding 32 in a clockwise direction and will thereby set core 26 in the condition constituting the storage of a digital 1. An advance pulse applied to winding 18 (from a suitable source now shown) will similarly change the state of core 26 from a 1 to a 0 and will advance the 1 to core 22 over winding 34. This change of state of core 26 will not, however, affect core 20 because the tendency for this change to produce an output in winding 32 which would affect core 20 is cancelled by the shunting effect of the rectifier 210.

If the next bit of digital information over input 14 constitutes an 0, no pulse will be sent by the tape reader and the state of core 20 will not be changed. It will remain in the state corresponding to zero which was created by the advance pulse. Since the transfer windings 32, 34, 38 will produce significant outputs only upon a change of the cores 20, 22 and 24 from 1 to 0 states and since the advance pulses set each core at 0, an advance pulse on winding 16 will not change the state of core 26 which was already set to 0 by the previous advance pulse on winding 18.

If, however, the input of the second bit of information on winding 14 to core 20 is a second digital 1, that core will again be changed from a 0 to a 1 state. A change in this direction, however, produces no current in winding 32 tending to change core 26 because of the effect of the rectifier 212. This isolating effect furthermore makes it possible to read information into core 20 before core 26 has been cleared by an advance pulse on winding 18. Assuming that both cores 20 and 22 contain a digital 1, an advance pulse on winding 16 will then advance this storage state to cores 26 and 28.

In the above described manner binary digital information is inserted into the register one bit at a time over input winding 14 to core 20 and then stepped from core 20 to core 26 to 22 to 28, etc. until the sequence of digital 1's and 0's is stored in the register in the form of the magnetic condition of cores 26, 28 and 30. The sequence is of course controlled by the sequence of holes on the punched tape 10 which constituted the permanent storage form.

The conventional means for sensing a state of a magnetized core is to apply a current to a winding around the core which will be sufficient to drive its residual flux to a given direction or polarity. The presence or absence of a voltage pulse induced in an output winding indicates whether or not the core actually did change state. By this means it is possible to detect the condition of the core, but it is necessary to destroy the information or original state in the core in order to do so. It is therefore necessary after reading the core in this manner to rewrite the information previously contained in it.

The subject invention, however, utilizes a non-destructive core sensing method developed by one of the inventors and described in the January 1954 issue of "Communication and Electronics" published by the AIEE.

This method of read-out is particularly well adapted to use in the subject invention where continuous streams of pulses are applied to the cores and the direction of residual flux in each core determines whether or not the pulse is transferred to the single output winding.

Figure 3:
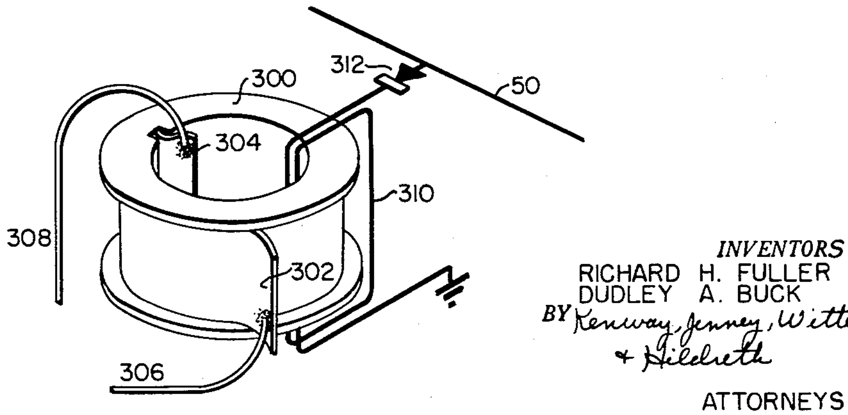
FIG. 3 is a perspective illustration of an exemplary magnetic core suitable for non-destructive interrogation.

The sensing configuration disclosed in FIG. 3 is based upon the prior discovery that if a quadrature field is applied for a short time to a magnetized element, it will temporarily reduce the effective amount of residual magnetism in the element. A quadrature field is a field at right angles to those produced by the input and output windings and therefore at right angles to the residual flux. The result of this momentary reduction in effective residual magnetic flux is a small voltage output or more precisely a pair of outputs of opposite polarity, the first induced in the output winding when the residual flux decreases and the second induced in the output winding when the residual flux increases. The reasons for the changes in flux linkages with output winding which are caused by the application of a quadrature field and which induce the voltage output pulses are more fully explained in the above-mentioned issue of "Communication and Electronics." Briefly stated, the application of the quadrature field results in a vector summation of the quadrature and residual fluxes, and in effect causes the latter to be rotated in a direction toward the quadrature field. The residual flux linking the output winding is thus reduced, and a voltage pulse is induced in that winding. When the quadrature field is removed, the reverse action takes place, i.e., the residual flux vector rotates back to its original position, increasing the flux linkage with the output winding, and inducing a voltage pulse in that winding which is opposite in polarity to the first pulse.

A preferred method for producing a quadrature field for use in the subject invention is illustrated in FIG. 3. As shown in this figure, a toroidal bobbin 300 is wound with conductive insulated magnetic tape 302 to form the storage cores 26, 28 and 30 referred to in FIGS. 1 and 2. The inner end of the wound ribbon 304 projects to the inside of the bobbin, and connecting wires 306 and 308 are utilized to apply a current to this insulated magnetic tape which forms the storage element itself. The current will flow in the wrappings around the bobbin when a sensing pulse is applied to the leads 306 and 308 and will create a quadrature field primarily at right angles to the field of residual magnetization. The change in residual flux is sensed by means of a conventional sensing winding 310 which makes one or more turns about the core. In order to prevent interaction between cores 26, 28 and 30, a rectifier 312 is connected in series between the winding 310 and the output line 50 and the other terminal of the sensing winding is grounded. Cores 26, 28 and 30 are therefore each coupled in parallel through an isolating diode to the output line 50.

Figure 4:
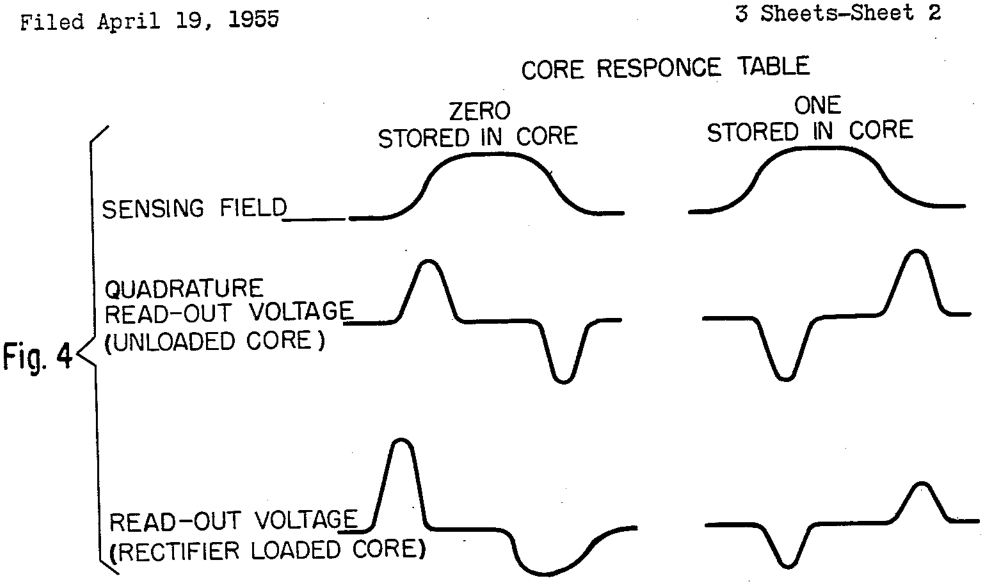
FIG. 4 shows output waveforms produced by an interrogation current pulse through the wrappings of core in FIG. 3.

In FIG. 4 the waveforms of the output induced in the winding due to a pure quadrature field are shown to consist of a pair of pulses of opposite polarity. The sequence of voltage pulse polarities depends upon the state, i.e., direction or polarity of the core's residual magnetism at the time it is sensed. However, for practical purposes it is desirable in this invention that a significant output be produced when the core is in one state and no significant output be produced when the core is in the other state.

A current in leads 306 and 308 through the wrappings as shown will not only apply a quadrature field to the core but also a relatively minor but significant magnetizing or setting field. This field results from the fact that the leads connecting with the ribbon form in effect a half turn about the core or viewed in another way, magnetic flux set up around the lead 308 as a result of current flow therein, is alined with the residual flux in the core. The resultant field reinforces the output due to the quadrature field component when the residual magnetism of the core is in one sense and reduces the output when the residual magnetism is in the opposite sense.

The structure of the register is, in accordance with one feature of the present invention, primarily responsible for the fact that if a quadrature field is applied to a core having a residual flux in one direction the output will be much larger than if the core has residual flux in the other direction. Each of the permanent storage cores 26, 28 and 30 is unilaterally loaded by the rectifiers 210, 212 and associated leads connecting it with the temporary shift cores. That is, some current flows in the transfer windings 32 and 34 (FIG. 2) when application or removal of the quadrature field changes the effective residual flux from its "1" direction toward its "0" direction. While this current flow does not change the state of the transfer cores 20 and 22, it creates a back MMF in the core 26 and reduces the total residual flux change. This does not occur, however, when the application or removal of the quadrature field changes the effective residual flux from its "0" direction toward its "1" direction. Unilateral loading of storage cores in the register increases the positive terminal output voltage occurring when a core containing a zero is interrogated and also decreases both the initial and terminal voltage outputs occurring when a one-containing core is interrogated.

Referring to FIG. 4 and to core 26 in FIG. 6, it will be seen that interrogation of a zero-containing core produces a flux change which attempts to force current in the high impedance direction of the external load. Little load current flows in the transfer windings and rapid flux change results within the core, hence a large positive output voltage induced in the output winding 310. When the interrogation pulse is removed, the flux in returning to its original configuration, forces current in the low impedance direction of the external load. A large current flows in the transfer winding 32, 34 and the flux change within the core is slowed to produce a small negative terminal output voltage in the winding 32, 34. Thus for interrogation of a zero-containing core, the initial output pulse is large, the terminal pulse, small. When a one-containing core is interrogated the initial flux change produces a large current in the low impedance direction of the external load. This current produces an MMF which subtracts from the applied MMF and results in a small flux change within the core. The negative output voltage thus generated in the winding 310 is small. The core is then unloaded during the fall to its original flux configuration as the interrogate pulse is removed. However, since the flux change during interrogation is small, the return is also small and a small positive terminal output voltage results in the winding 310. Thus both initial and terminal outputs are small when a one-containing core is interrogated. The only large output obtained from either mode of intrerrogation is the initial output from a zero-containing core. Since large sensing output is obtainable only from cores containing zeros, it is desirable to amend somewhat the circuit logic as described above. Instead of storing a binary number (e.g. 11011) in the register its so-called nines-complement (e.g. 00100) is actually fed into the register. Because of the above unilateral loading this will result in a large output voltage from the cores which appear to store a zero and this output will, in the remaining logic of the system, designate a one.

In order to produce a significantly large output by means of a quadrature sensing field, it is necessary that rather large interrogating currents be applied to the cores. It is this fact which makes it desirable to utilize the magnetic gate driving configuration described with reference to FIG. 1 and also illustrated in FIG. 6, wherein large currents are applied to the magnetic gate by an interrogate driver (amplifier) and the magnetic gates are activated by means of relatively small buffer amplifier for each stage.

Figure 5:
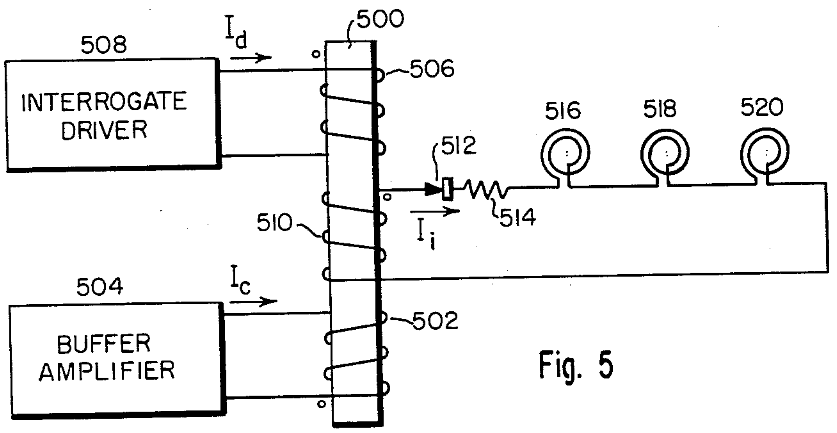
FIG. 5 is a schematic diagram of a magnetic gate utilized to interrogate the cores in the register of FIG. 1.

The operation of such a magnetic gate is described more completely by reference to FIG. 5. The saturable magnetic element 500 carries a control winding 502 energized from the buffer amplifier 504 and a drive winding 506 energized from the interrogation driver 508.

In addition, the saturable magnetic element 500, which acts in effect as a magnetic amplifier, carries the output winding 510. This winding leads through a diode 512 and a resistor 514 through series of quadrature field windings 516, 518 and 520 representing several cores in series. This invention is being described by reference to a single register only, but reference to the above-mentioned copending case will make it clear that interrogation pulse trains may be supplied to storage cores for a series of registers of this type, the output from each register representing a separate channel and carrying a separate number of output pulse representative of the value stored by the state of the cores in that register.

As described by reference to FIG. 1 it is a function of the buffer amplifier to set or "open" the magnetic element 500 utilizing a relatively low level current. This is done by a control current $I_c$ applied in the direction of the arrow to the winding 502. Assuming that the core has just been driven by the interrogate driver to reverse its magnetized state the control current $I_c$ will be sufficient to return it to its original set position. Because of the low level of the control current this reversal is accomplished relatively slowly thereby reducing the speed of the flux reversal and correspondingly reducing the voltage peak which would be produced by this reversal. However, in order to make it possible to reset the core with reasonable speed and without applying even a small false interrogate signal to the cores 516, 518, 520 in series with the winding 510, the rectifier element 512 is placed in the read winding output. This in effect isolates the cores from the action of the control current in setting the magnetic gate and makes it possible to set the gate with a relatively small current since only the gate itself must be driven by the buffer amplifier 504.

The interrogate driver 508 applies a large driving current $I_d$ to the winding 506 in the direction indicated. This driving interrogate pulse is actually the same pulse used to set the gate, but it has been delayed by delay element 116 and greatly amplified by the interrogate driving amplifier. The direction of this current in the coil 506 is such that it will tend to reverse the magnetic element back again to its unset condition. In addition, this current is a high level energization tending to rapidly reverse the flux and therefore to produce a relatively large voltage output on the winding 510. The direction of the induced interrogation current is such that the diode 512 will not isolate the cores and each of the cores 516, 518, 520 in series with the winding 510 will receive a relatively high level interrogation current through the toroidal ribbon which produces the quadrature interrogating field.

Referring again to FIGS. 1 and 6, it will be seen that a digital number stored in the form of a row of holes in a paper tape 10 may be stepped directly over lead 14 into the magnetic storage register 15 where it will be stored in cores 26, 28 and 30. As mentioned above the unilateral loading of these storage cores by the transfer windings connecting it with the other cores may make it desirable to actually store the nines-complement of the original digital number. When the binary number which corresponds to a given numerical value has been inserted in the register the register is interrogated in the following manner. One pulse is applied to core 30 over lead 64. If the core 30 was in a condition calling for an output of a digital one a single output will appear on output line 50 in response to the interrogation pulse on line 64. During the same period of time two interrogation pulses which are spaced in time with respect to the pulse on line 64 are applied to core 28 over line 62. Depending on the condition of core 28 this will produce either two pulses on line 50 or no pulses on line 50. In the same fashion four pulses will be applied during the same period of time over line 60 to core 26. None of these pulses will coincide in time with those of the other interrogate leads and again, either four outputs or no output will appear on line 50 depending on the state of the core 26. From the above abbreviated explanation it will be seen that for each eight pulses produced by the pulse generator any number of pulses from 0 to 7 may be produced over the output line 50 depending on the conditions of three cores 26, 28 and 30. Since the state of the cores is determined by the tape 10, it is possible in this manner to produce a number of pulses on line 50 in a given space of time which is a function of the digital information stored on the punched tape 10. By way of specific example, assume that the value of the binary number held by the tape 10 is six. In binary form, this would be represented as 011; and the nines complement would be written as 100. The latter binary expression is shifted into the magnetic register, as previously explained, so that the cores 26, 28 and 30 have residual flux directions storing "0," "0," and "1," respectively. Then, as the pulse generator produces eight successive pulses on the lines 91, 92, the tandemly connected flip-flops 94, 96 and 98 by their dividing or scaling action will provide four pulses on the line 106, two pulses on the line 110, and one pulse on the line 114. Through the action of the gates 66, 68, 70, four interrogating pulses will appear on the line 60, two interrogating pulses will appear on the line 62, and one interrogating pulse will appear on the line 64, all of these pulses being non-coincident. As a result, the core 26 will be interrogated four times and the core 28 interrogated two times. Because these two cores are in the "0" state, each such interrogation will produce an output pulse on the output line 50, i.e.. there will be six pulses on the line 50, corresponding to the value "six" of the stored binary information. The core 30 will be interrogated once, but because it is in the "1" state it will not produce an output pulse. It will thus be seen that the present system permits repeated interrogation of magnetic storage elements and produces a conversion of a value represented in binary digital form into pulses or signals equal in absolute number to the value of the stored information.

While this invention has been described with respect to a specific embodiment it will be understood that many variations of the above-described apparatus will be possible without departing from the invention as defined by the following claims.

We claim:

1. Magnetic data conversion apparatus for producing a train of specified number of pulses in accordance with stored digital information which comprises permanent storage means containing information specifying the desired number of pulses, a register of magnetic cores having a substantially rectangular hysteresis characteristic, means for setting polarities of residual flux in the cores in accordance with the stored digital information, means for interrogating each of the cores in staggered sequence while preserving the settting of each core, output means common to all the cores in the register, and means for distinguishing the output pulses produced by cores of a chosen polarity whereby the number of significant output pulses in relation to the number of interrogations is a function of the register core polarities.

2. A magnetic core storage element comprising a magnetic element having a substantially rectangular hysteresis characteristic, means for applying a control magnetizing force to said element to control its residual flux direction, means including a unidirectional impedance element for loading said magnetic element, means for temporarily applying an interrogating quadrature field to said element, and an output winding on said element for sensing the resulting flux changes, whereby the size of the first output pulse in said winding in response to an interrogation is dependent on the residual flux direction of the element in relation to the unidirectional impedance load.

3. Magnetic data conversion apparatus for producing a train of a specified number of pulses in accordance with stored digital information comprising a permanent storage means for the information, a register of magnetic cores having a substantially rectangular hysteresis characteristic, means for setting the register cores to correspond to the stored digital information, a pulse generator, means for utilizing each pulse produced by the generator to interrogate one core of the register without destroying the setting of the core, an output lead common to the cores in the register, and means for producing a significant output only from cores magnetized in one direction whereby the total number of significant output pulses in relation to the number of pulses produced by said generator depends upon the saturation state of the cores in the register.

4. Magnetic data conversion apparatus for producing a train of pulses in accordance with stored digital information comprising a permanent storage means for the information, a register of magnetic cores having a substantially rectangular hysteresis characteristic, means for setting the register cores to correspond to the stored digital information, a pulse generator, means for applying a quadature field to each core to determine its state nondestructively, an output lead common to the storage cores in the register, means for applying each pulse from the generator to energize the quadature field of at least one core in the register whereby the cores will produce a significant output only if magnetized in one direction.

5. Apparatus for producing a train of a specified number of pulses in accordance with stored digital information comprising a permanent storage means for the information, a register of magentic cores having a substantially rectangular hysteresis characteristic, means for reading the digital information from the storage means to the register, means including a rectifier for transferring the information along the register as each new bit is read and inserted, a pulse generator, means for applying each pulse derived from the generator to interrogate one core in the register, an output lead common to all the cores in the register, and means for detecting the response to interrogation of cores magnetized in one direction only whereby the total number of significant output pulses in relation to the total number of pulses from said generator depends upon the saturation of the cores in the register.

6. A magnetic data conversion system comprising a stepping register of magnetic cores having a substantially rectangular hysteresis characteristic, stepping windings between successive cores, a rectifier for each stepping winding, means for stepping binary digital information into the register and thus setting the residual flux direction in said cores, interrogating means for applying a quadrature field to each core, a magnetic gate to energize each quadrature field, a set winding for each magnetic gate, an output winding including a rectifier for each magnetic gate, and a driving winding common to all the magnetic gates, a bistable circuit corresponding to each set winding, means for utilizing one output of each bistable circuit to energize the corresponding set winding and "open" the corresponding gate, means for utilizing the other output of each bistable circuit to change the state of the next bistable circuit, a pulse generator to generate a train of pulses, means for utilizing these pulses to drive the first of the series of bistable circuits, means for delaying each pulse in said train, means utilizing each delayed pulse to energize the driving winding common to all said magnetic gates, an output winding for each said core, a common output line, and a rectifier connecting each output winding to the common output line.

7. A magnetic data conversion system comprising a register of magnetic cores having a substantially rectangular hysteresis characteristic, means for setting the residual dual flux direction of the cores in accordance with binary digital information, interrogating means for applying a quadrature field to each core, means for producing trains of different predetermined numbers of pulses in a given time to energize respective ones of said interrogating means, an output line, and means for producing a single separate pulse on the ouput line from each core magnetized in one direction only in response to each energizing pulse applied to the interrogating means for that core, whereby the total number of pulses on the output line in a given time is determined by the core settings.

8. A magnetic data conversion system comprising a register of magnetic cores, each core being formed of a coil of insulated conductive magnetic material having a substantially rectangular hysteresis characteristic, means for setting the residual flux direction of the register cores in accordance with binary digital information, a pulse generator, a chain of bistable circuits, means for energizing the first bistable circuit with the output of the pulse generator, means for passing one output of each successive bistable circuit through the insulated magnetic coil of one core, means for applying the other output of each bistable circuit to change the state of the next bistable circuit, and output means for each core capable of detecting the change of the residual flux induced by each pulse through the coil forming the core.

9. A magnetic data conversion system as defined in claim 8 having in addition a single output line, and means for combining on the single output line the outputs from cores magnetized in one direction only.

10. Magnetic data conversion apparatus for converting binary digital numerical information into a train of pulses related in their number to the numerical information, said apparatus comprising, in combination, a magnetic shifting register including one storage core and one transfer core per digit place with stransfer windings interconnecting the transfer cores and storage cores of successive digit places, said cores having a substantially rectangular hysteresis characteristic, unidirectionally conductive devices connected with said transfer windings to effect transfer in one direction only and operative to unidirectionally load said storage cores, means for shifting binary digital number information into said storage cores by setting the direction of residual flux therein, interrogating means for creating a quadrature field in each of said storage cores, a source of pulses, means for distributing said pulses to said interrogating means for said storage cores in weighted proportion according to the value of each cores digit place, and output windings on said storage cores connected in parallel.

11. A magnetic data conversion system comprising a magnetic register including a plurality of magnetic cores each assigned to one digit place of a binary digital expression, said cores having a substantially rectangular hysteresis characteristic, means for setting residual flux of the cores in the register in accordance with specified binary digital numerical information, a pulse generator, means for utilizing the generator pulses to non-destructively interrogate each core of the register a number of times weighted in proportion according to the value assigned to that core's digit place, a single output line, and means on said cores responsive to interrogation only when the cores have residual flux of one predetermined direction for producing a train of pulses on said output line which is proportional in number to the value of the stored binary information.

12. Conversion apparatus comprising, in combination, a register including a plurality of magnetic cores each assigned to a digit place representative of a certain value, said cores having a substantially rectangular hysteresis characteristic, means for setting the residual flux of each said core to a "0" or a"1" state in accordance with numerical information in binary digital form, means responsive to a current pulse for non-destructively interrogating each of said cores, a tandemly connected plurality of flip-flops each corresponding to one of said cores, a pulse source and means supplying its pulses to that one of said flip-flops corresponding to the core assigned to the highest order digit place, a plurality of magnetic gates each associated with one of said flip-flops, means for causing each non-carry output pulse from each flip-flop to set the corresponding gate, means for delaying and amplifying the pulses from said source and applying such pulses as inputs to all of said gates, means for supplying output pulses from said gates to energize the interrogating means of the associated core, an output winding on each said core, and an output line common to all of said output windings, whereby the pulses appearing on said output line are related in number to the value of the binary digital information stored in said cores.

13. A magnetic data conversion system comprising a register of magnetic cores each corresponding to one digit place assigned a predetermined numerical value, said cores having a substantially rectangular hysteresis characteristic, means for setting the cores in accordance with binary digital information, means for applying a quadrature field to each of the cores, an output winding for each core responsive to the change in residual flux produced by the quadrature field, means including a pulse generator for periodically and repetitively energizing the quadrature field of each core with non-coincident pulses proportioned to the total number of pulses from the generator according to the assigned value of the digit place for that core, means for producing from the output winding on each core a number of output pulses corresponding to the number of energizations of the quadrature field for that core only when said core is magnetized in one predetermined direction, a single output line and means for combining the output pulses of each core on said line, the total combined number of said output pulses being related to the number of pulses from said generator according to the value of binary digital information represented by the setting of said cores.

14. A magnetic data conversion system comprising a register of magnetic cores having a substantially rectangular hysteresis characteristic, means for magnetizing the cores in accordance with binary digital information, an output winding for each core, an interrogation winding for each core, a pulse generator, a magnetic gate to interrogate each core, a rectifier connecting each magnetic gate to the associated interrogation winding, means for utilizing each pulse from the generator to successively set different ones of said magnetic gates to a predetermined magnetic state, a driver winding for all the magnetic gates, and a delay element passing delayed pulses from said generator to the driver winding to reverse the state of all the set driver gates thereby producing an interrogation pulse for each associated storage element.

References Cited in the file of this patent

UNITED STATES PATENTS 2,708,722 Wang ________________ May 17, 1955

OTHER REFERENCES

"Nondestructive Sensing of Magnetic Cores" (Buck et al.). Communciations and Electronics, January 1954, pp. 822–830.

"A New Nondestructive Read for Magnetic Cores," by R. Thorensen and W. R. Arsenault, published August 1955, "1955 Western Joint Computer Conference," pp. 111–116.